though the reaction proceeds by the typical Schotten-Baumann reaction.

United States Patent Office 2,987,526
Patented June 6, 1961

2,987,526
PROCESS OF PREPARING SALT-FREE N-ACYL TAURINES
Leslie M. Schenck, Mountainside, N.J., assignor to General Aniline & Film Corporation, New York, N.Y., a corporation of Delaware
No Drawing. Filed Oct. 6, 1959, Ser. No. 844,614
6 Claims. (Cl. 260—401)

The present invention relates to an improved process of preparing salt-free anionic surface active agents obtained from an amino-alkane sulfonic acid and a fatty acid chloride.

The reaction of a fatty acid chloride with 2-amino-alkane sulfonic acid and the alkali metal salts thereof to yield anionic surface active agents is well known. In U.S. Patent 1,932,180, there are described several procedures for the preparation of such surface active agents. The processes described therein fall into three categories, wherein (1) a free fatty acid dissolved in an aliphatic amine is mixed with an amino-alkane sulfonic acid (taurine) and then heated to boiling, (2) an alkyl ester of a fatty acid is heated with the sodium salt of an amino-alkane sulfonic acid, and (3) a carboxylic acid chloride is treated in aqueous medium with 2-amino-alkane sulfonic acid in the presence of caustic soda. The latter process is the one principally used in the preparation of surface active agents sold commercially under the brand name of "Igepons." In this process when the acid chloride is treated with a taurine or a taurine salt, an anionic surface active agent is obtained containing a considerable quantity of salt, i.e. sodium chloride, which is highly undesirable when the anionic surface active agent is employed in built soap-bar formulations. The presence of sodium chloride is the reason why some of the "Igepons" currently sold possess great hygroscopicity. The removal of the free salt from the "Igepon" is very expensive. The presence of common salt as a contaminant in anionic surface active agents of the "Igepon" type has been recognized not only by the patentees of U.S. Patent 1,932,180, particularly Example 37 and the description thereafter, but also by the teachings of German Patent 664,309, in which an attempt was made to prepare an anionic surface active agent free from salt by reacting the fatty acid amide with a chloroethane sulfonic acid salt in an inert medium capable of dissolving the desired "Igepon," filtering the "Igepon" free from salt and recovering the salt-free "Igepon" by evaporation of the filtrate. Inasmuch as contamination by inorganic salts in commercial "Igepons" is of over increasing importance due to their corrosive effect in the packaging of heavy liquid detergents, adverse effect in synthetic soap bars and mold lubricants, and undesirable in certain emulsion polymerization reactions, renewed activity and efforts have been made to devise processes which would yield salt-free products.

In PB Report No. 70,344 T.H.K., Scientific Exchange, Hoechst No. 154 and Register No. Ho 43/4, by Dr. Frank, there is described the preparation of "Igepons" by dehydrating a mixture of fatty acid and the sodium salt of methyl taurine at temperatures exceeding 200° C. producing a salt-free product. Dr. Frank states in the report that it seems of importance to prepare "Igepon" derivatives of the taurine series free from sodium chloride, since the salt content of technical "Igepon T" powder products is the main cause of their great hygroscopicity, and a new procedure for their preparation without this contaminant would therefore represent an important progress. In conclusion, Dr. Frank states that procedures described in PB No. 70,344 were unsatisfactory from another viewpoint. A separation of methylamine or ammonia was unavoidable during the thermal dehydration procedure, being detrimental to both yield and quality of the product. Furthermore, an additional step is required to recover reaction components lost by the inherent distillation of the fatty acid at the high temperatures necessary to promote the reaction.

As outlined by Dr. Frank, a careful selection of fatty acids is required to prevent undesirable discoloration of the fat moiety at elevated temperatures, as well as highly specialized equipment requirements. A study of the prior art relating to salt-free "Igepons" invariably shows either the taurine or fatty acid must be used in a large molar excess to promote the reaction to upwards of 90% completion.

A more startling revelation of salt content in common commercial "Igepons" derived from fatty acids and methyl taurine is taught by Kastens et al., Ind. and Eng. Chem., vol. 42; September–December 1950; pp. 1628–1638. As noted in Kastens et al., p. 1630, column 2, a mole of salt (sodium chloride) is formed for every mole of "Igepon." By weight ratio, this corresponds to 56 lbs. of salt for each 425 lbs. of their "Igepon T."

From the foregoing discussion of the prior art, it is clearly manifest that an improved process of reacting a taurine derivative with a fatty acid chloride to yield a salt-free product is highly desirable. Accordingly, it is the principal object of the present invention to provide such a process.

I have discovered that by reacting an alkali metal salt of a taurine or taurine derivative in an aqueous slurry or solution with a fatty acid chloride containing from 6 to 22 carbon atoms under specific conditions of temperature and in the presence of a particular organic solvent, an anionic surface active agent of the "Igepon" type is produced which is not only salt-free but also free from traces of other water soluble impurities including unreacted taurine or taurine derivatives. I have also discovered that under the conditions of my operation essentially quantitative yields of the desired product are obtained in a hitherto unrealized state of purity and that all of the shortcomings of the prior art procedures are completely eliminated despite the fact that my reaction is conducted under hydrous conditions.

In all of the teachings of the literature relating to the production of "Igepons" by a typical Schotten-Baumann reaction between fatty acid chlorides and taurines in aqueous or aqueous-organic alkaline systems, it is evident that the reaction either produces an unfilterable slurry or a solution from which the product can only be obtained by evaporation. Contrary to expectations, I have discovered that by performing the Schotten-Baumann type condensation under hydrous conditions in a selected inert solvent exhibiting little solubility for "Igepons," but either soluble or easily removed by water, there is formed in essentially quantitative yield an "Igepon" slurry with a distinct physical form that can then be either directly filtered and water washed free of solvent and water soluble impurities, or be diluted with sufficient water to dissolve out water soluble impurities and be isolated by direct filtration from the dilute aqueous slurry. In my improved process, the reactive intermediates can be treated at a temperature range of 0°–60° C., preferably at 30° to 56° C. and in the presence of an organic solvent. From 0% up to 15% of water in the solvent may be tolerated, depending on the physical characteristics of the "Igepon" being prepared. Since the operation is performed at moderate temperatures, no discoloration of product or reactants is experienced, and the original purity of the intermediate is representative of the final product, excluding those impurities that are water soluble and thereby removed during the processing.

Among the several advantages of the process of my invention for the production of salt-free "Igepons" based upon substituted and unsubstituted taurines, it should be further noted that the highly specialized equipment required by the prior art to maintain the necessary reaction conditions for production of the desired end product is no longer necessary. Since equipment suitable for the high temperature reactions disclosed in the prior art is expensive to install and maintain, my process will permit more economically feasible operation not only from an equipment standpoint, but one which provides product purity hitherto unobtainable.

As examples of carboxylic acids which are employed in the form of acid chlorides, with an alkali metal salt of a taurine or substituted taurine in an aqueous slurry or solution, any carboxylic acid chloride of at least 6 carbon atoms and not more than 22 carbon atoms may be employed. It is to be noted at the outset that the nature or character of the acid chloride is immaterial so long as it contains a minimum of 6 carbon atoms and not more than 22 carbon atoms. The acid chloride may be derived from a saturated or unsaturated aliphatic, alicyclic or aliphatic aromatic acid. Acids of this type include caproic acid, isocaproic acid, enanthic acid, δ-methylhexylic acid, caprylic acid, ε-methylheptylic acid, dipropylacetic acid, pelargonic acid, s-methyloctylic acid, capric acid, η-methylnonylic acid, isoamylisopropylacetic acid, undecylic acid, θ-methyldecylic acid, di-tert.-butylmethylacetic acid, lauric acid, diisoamylacetic acid, tridecylic acid, myristic acid, pentadecylic acid, palmitic acid, di-n-heptylacetic acid, margaric acid, stearic acid, di-n-octylacetic acid, nondecylic acid, arachidic acid, behenic acid, γ-hexenoic acid, β-hexenoic acid, pyroterebic acid (4-methyl-β-pentenoic acid), α-ethylcrotonic acid, teracrylic acid, d-citronellic acid, ι-undecylenic acid, oleic acid, elaidic acid, erucic acid, brassidic acid, sorbic acid, stearolic acid, linolic acid, behenolic acid.

In addition to these acids, acids obtained from tall oil, hydrogenated tall oil, hydrogenated tallow, naphthenic, abietic and the like may be employed in the form of their acid chlorides. Alkyl benzoic acids, such as dodecyl benzoic acid, nonyl benzoic acid, octyl benzoic acid, alkyl naphthoic acids such as nonyl naphthoic acids and the like may be used in the form of their acid chlorides. Acid mixtures from various natural plant and animal oils, such as olive, tallow, castor, peanut, coconut, soybean, cottonseed, linseed, palm, corn, and the like may also be employed in the form of their acid chlorides.

The 2-amino-2-alkane sulfonic acid salts that are employed in an aqueous slurry or solution and condensed with the foregoing carboxylic acid chlorides are characterized by the following general formula:

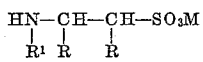

wherein R represents either hydrogen, methyl or ethyl group, and R¹ represents either hydrogen or a hydrocarbon radical having from 1 to 20 carbon atoms, e.g. methyl, ethyl, propyl, butyl, amyl, hexyl, cyclohexyl, phenyl, heptyl, octyl, dodecyl, oleyl, linoleyl, stearyl, abietinyl, etc., and M represents an alkali metal, e.g., sodium or potassium.

As examples of 2-amino-alkane sulfonic acids that are reacted in the form of their alkali metal salts in an aqueous slurry or solution with the above carboxylic acid chlorides to form anionic surface active agents, the following are illustrative:

2-AMINO-ALKANE SULFONIC ACIDS

Taurine
Ditaurine
N-methyl taurine
N-methyl ditaurine
N-ethyl taurine
N-isobutyl taurine
N-tert.-butyl taurine
N-amyl taurine
N-hexyl taurine
N-cyclohexyl taurine
N-propyl taurine
N-isopropyl taurine
N-butyl taurine
N-phenyl taurine
N-heptyl taurine
N-octyl taurine The salts of the foregoing 2-amino-alkane sulfonic acids are readily prepared by neutralization of the sulfonic acid with an equivalent amount of sodium or potassium hydroxide or carbonate. The concentration of the thus prepared salt in aqueous slurry or solution may range from 5 to 95%. In other words, the salt content in the aqueous system is from 5 to 95%.

As examples of the organic solvent, I have found that acetone, dioxane and methylethyl ketone when employed at a temperature range of 30–56° C. give the best yields and a salt-free product. As noted above, as much as 15% of water in the solvent may be tolerated. However, for best results, I prefer to employ initially, i.e., at the outset of the condensation reaction, anhydrous acetone, dioxane or methylethyl ketone.

The following examples will illustrate the nature of the improved process and the results obtained therefrom. All parts given are by weight.

*Example I*

Into a 5 liter flask equipped with an efficient agitator, thermometer and reflux condenser there were added 1380 parts of essentially anhydrous acetone, 121.8 parts of methyl taurine as a 54% aqueous slurry of its sodium salt and 30 parts of sodium hydroxide. To this mixture was added dropwise at 55° C. (reflux) over a period of 3 hours 240 parts of stearoyl chloride and the reaction mixture refluxed for an additional hour then cooled to 20° C. and diluted with 1200 parts of water. The product was removed by filtration and washed with sufficient cold water to displace the mother liquor in the cake. Upon drying at 85° C. there was obtained the N-stearoyl methyl taurine as a pure white powder in 95% of theoretical yield. It exhibited excellent detergent properties and analyzed as follows:

| | Percent |
|---|---|
| Percent activity by methylene blue analysis, M.W. 412 | 92.5 |
| Percent inorganic salts as sodium chloride | 0.175 |
| Percent free fatty acid, M.W. 287.5 | 3.83 |
| Percent methyl taurine, M.W. 139 | 0.28 |
| pH 10% slurry | 8.8 |
| Percent moisture | 3.1 |

The percent activity in the foregoing analysis was made by the methylene blue method described in Nature 160, 759 (1947), and Trans. Faraday Soc. 44, 226–239 (1948). The determination of stearic acid was made by extraction with petroleum ether and titration of the petroleum ether residue. The methyl taurine sodium salt was determined by titration of the solution which had been extracted with petroleum ether to remove the fatty acid and the other components (by difference) were determined from the weight of the petroleum ether residue subtracting stearic acid.

*Example II*

Into a 3 liter flask equipped with an efficient agitator, thermometer and reflux condenser there were charged 460 parts of essentially anhydrous acetone, 40.6 parts of methyl taurine as a 54% aqueous slurry of its sodium salt and 10 parts of sodium hydroxide. To the mixture there was added dropwise at 55° C. (reflux) over a period of 3 hours 76.5 parts of palmitoyl chloride (of 95% purity and having a molecular weight of 274.5). The reaction mixture was refluxed an additional hour, cooled to 20° C. and diluted with 400 parts of cold water. The product was removed by filtration and washed with sufficient cold water to displace the mother liquor in the cake. Upon drying at 85° C. there was obtained N-palmitoyl methyl taurine as a pure white powder free from salt and by the methylene blue analysis showed 96.3% activity.

Example III

To a suspension of 14.7 parts of taurine (0.1 mole) as a 40% aqueous slurry and 4 parts of sodium hydroxide (0.1 mole) in 200 parts of essentially anhydrous acetone and 10 parts of water there was added during a period of 1 hour at 40° C. 29 parts of stearoyl chloride (0.1 mole). After several hours of agitation, the precipitated N-stearyl taurine and sodium chloride was diluted with 100 parts of water to dissolve out the salt and any unreacted taurine. The product was filtered off and washed free of remaining traces of salt with cold water. The yield obtained by the methylene blue analysis was 94%. Further analysis showed that the product was free of sodium chloride and residual chlorine.

Example IV 121.8 parts of methyl taurine as a 54% aqueous slurry of the potassium salt and 42 parts of potassium hydroxide were reacted in 1380 parts of essentially anhydrous acetone with 240 parts of oleic acid chloride at 40° C. for a period of 2 hours. The solids were removed from the easily filterable slurry by filtration and the cake washed with three 100 portions of cold water to give an essentially quantitative yield of N-oleoyl methyl taurine. Upon analysis by the methylene blue method a 96.5% yield was obtained. Further analysis showed that the product contained less than 0.1% of sodium chloride and no residual methyl taurine.

Example V

Example I was repeated with the exception that 1380 parts of acetone were replaced by 1200 parts of essentially anhydrous methylethyl ketone. Identical analytical results as shown in Example I were obtained.

Example VI

Example II was repeated with the exception that 460 grams of acetone were replaced by 400 grams of essentially anhydrous dioxane. The same identical results as those in Example II were obtained.

Example VII

Into a 5 liter flask equipped with an efficient agitator, thermometer and reflux condenser there were added 590 parts of essentially anhydrous acetone, 40.6 parts of methyl taurine as a 30% aqueous solution of its sodium salt and 10 parts of potassium hydroxide. The mixture was slurried and to it there was added at 50° C. over 1 hour (reflux) 84 parts of tallow acid chloride. The reaction mixture was refluxed an additional hour and the suspension cooled to room temperature. There was then added 400 parts of water to dissolve out sodium and potassium chlorides and any other remaining water soluble compounds. The filtered product was washed with 150 parts of cold water to displace the mother liquor in the cake yielding a paste which analyzed as 39.8% N-tallowyl methyl taurine, 0% of potassium and sodium chloride, 0% of methyl taurine, 2.1% of free tallow acid and 57.8% of water. The product exhibited excellent detergent properties.

Example VIII

Example I was repeated with the exception that the methyltaurine sodium salt and stearoyl chloride were replaced by 158 parts of N-butyl taurine as a 5% aqueous solution of its sodium salt and 229 parts of palmitic acid chloride, respectively. Upon drying at 85° C., there was obtained N-palmitoyl butyl taurine as a white powder free from salt and with an activity of 93.2% by the methylene blue analysis.

Example IX

Example I was repeated with the exception that 121.8 parts of methyl taurine were replaced by 208 parts of N-octyl taurine (containing 5% water by the xylol moisture method) and 240 parts of stearoyl chloride were replaced by 182 parts of lauric acid chloride. Upon drying at 85° C., there was obtained in 95.8% yield a white waxy powder analyzing 97.8% as N-lauroyl octyl tauride by the methylene blue analysis.

Example X

Example I was repeated with the exception that the methyltaurine sodium salt and stearoyl chloride were replaced by 209 parts N-hexyl taurine (containing 5% water by the xylol moisture method) and 250 parts of elaidic acid chloride. Upon drying, the product was obtained as a white powder containing 90.1% of the "Igepon" derived from elaidic acid and N-hexyl taurine, 0.11% sodium chloride, 4.3% eladic acid, and 5% moisture.

Example XI

Operating in a manner identical with Example II with the exception that 40.6 parts of methyl taurine were replaced by 60 parts of cyclohexyltaurine as a 17% aqueous slurry of its sodium salt to produce N-palmitoyl cyclohexyl taurine which was dried at 85° C., to a white waxy powder containing less than 0.2% salt and analyzing 94.1% pure by the methylene blue analysis.

By the term "aqueous slurry" as employed in the appended claims, I mean either slurry or solution as shown hereinbefore.

This application is a continuation-in-part of my application Serial No. 757,196, filed on August 26, 1958.

I claim:

1. The process of preparing an N-acyl-taurine substantially free from alkali metal chloride and water soluble impurities which comprises heating at a temperature of 0°–60° C., in the presence of an inert solvent selected from the group consisting of acetone, dioxane and methylethyl ketone, 1 mole of a fatty acid chloride containing from 6 to 22 carbon atoms with 1 mole of a 5 to 95% aqueous slurry of 2-amino-alkane sulfonic acid salt having the following general formula:

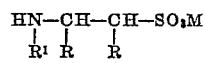

wherein R represents a member selected from the class consisting of hydrogen, methyl and ethyl groups, and $R^1$ represents a member selected from the class consisting of hydrogen and a hydrocarbon radical containing from 1 to 20 carbon atoms and M represents an alkali metal, said heating conducted in the presence of about 1 mole of alkali metal hydroxide for each mole of said fatty acid chloride and for each mole of said 2-amino-alkane sulfonic acid salt.

2. The process according to claim 1 wherein the 2-amino-alkane sulfonic acid salt is methyl taurine sodium salt.

3. The process according to claim 1 wherein the 2-amino-alkane sulfonic acid salt is taurine sodium salt.

4. The process according to claim 1 wherein the 2-amino-alkane sulfonic acid salt is N-butyl taurine sodium salt.

5. The process according to claim 1 wherein the 2-amino-alkane sulfonic acid salt is N-hexyl taurine sodium salt.

6. The process according to claim 1 wherein the 2-amino-alkane sulfonic acid salt is N-octyl taurine sodium salt.

No reference cited.